Jan. 8, 1929.  
P. G. QUEDENS  
1,698,319  
TAPER ATTACHMENT  
Filed May 20, 1925  
2 Sheets-Sheet 1
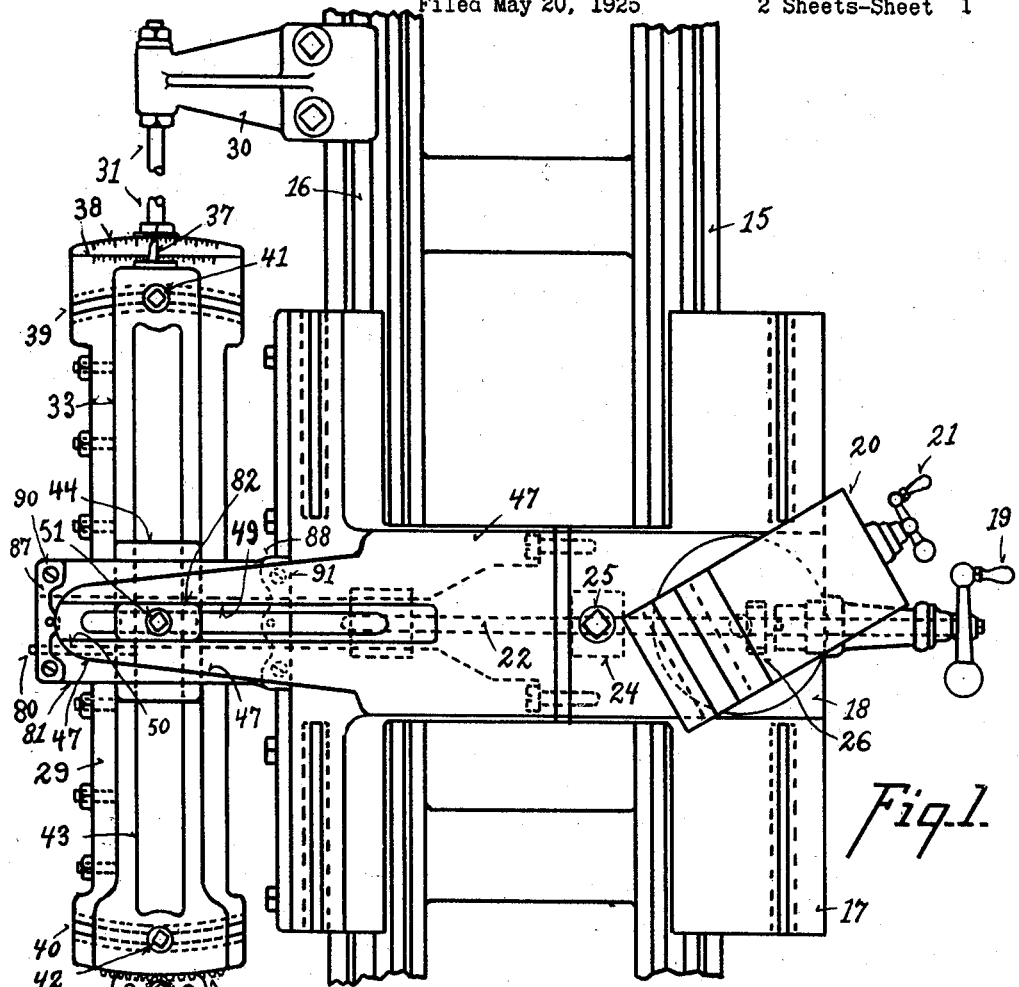
Fig.1.
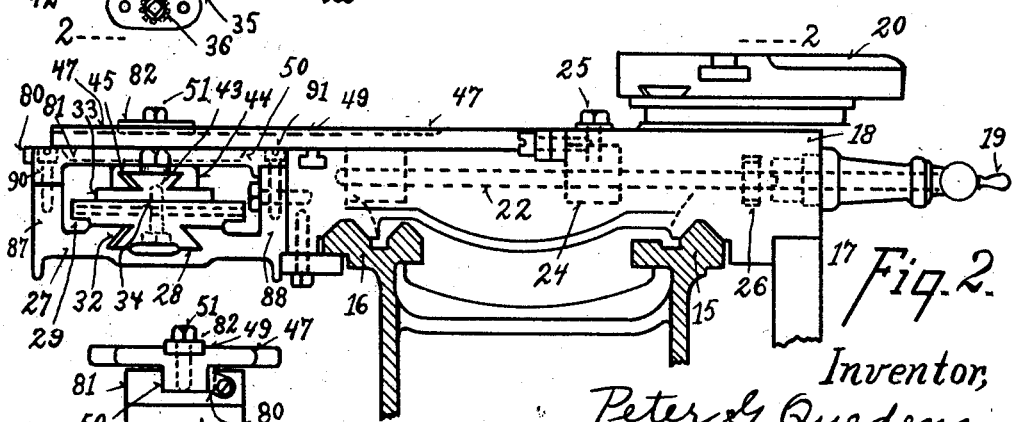
Fig.2.
Fig.3.
Inventor,
Peter G. Quedens,
By C. W. Miles,
Attorney.

Jan. 8, 1929.
P. G. QUEDENS
1,698,319
TAPER ATTACHMENT
Filed May 20, 1925
2 Sheets-Sheet 2

Inventor,
Peter G. Quedens,
By C. W. Miles,
Attorney.

Patented Jan. 8, 1929.

1,698,319

UNITED STATES PATENT OFFICE.

PETER G. QUEDENS, OF BLUE ASH, OHIO, ASSIGNOR TO THE CINCINNATI LATHE AND TOOL COMPANY, A CORPORATION OF OHIO.

TAPER ATTACHMENT.

Application filed May 20, 1925. Serial No. 31,686.

My invention relates to improvements in lathe taper attachment. One of its objects is to provide a more reliable and rigid mounting of the taper attachment members, whereby more accurate results are attainable. Another object is to provide improved means to make the adjustments required in operating the taper attachment. Another object is to provide improved means to take up lost motion and thereby provide against chattering and other inaccuracies of feed. Another object is to provide improved means for connecting the taper attachment to the tool rest through the tool cross feed screw to permit taper and hand feed at the same time. My invention also comprises certain details of form and combination of components, all of which will be fully set forth in the description of the accompanying drawings, in which:

Fig. 1 is a plan of a lathe tool carriage and taper attachment embodying my invention, and in which the movable member of the taper attachment is directly connected to the tool slide.

Fig. 2 is a vertical section through the apparatus of Fig. 1, taken on the line 2—2 of Fig. 1.

Fig. 3 is a detail end view of the taper attachment support and connection with the tool carriage.

Figure 4:
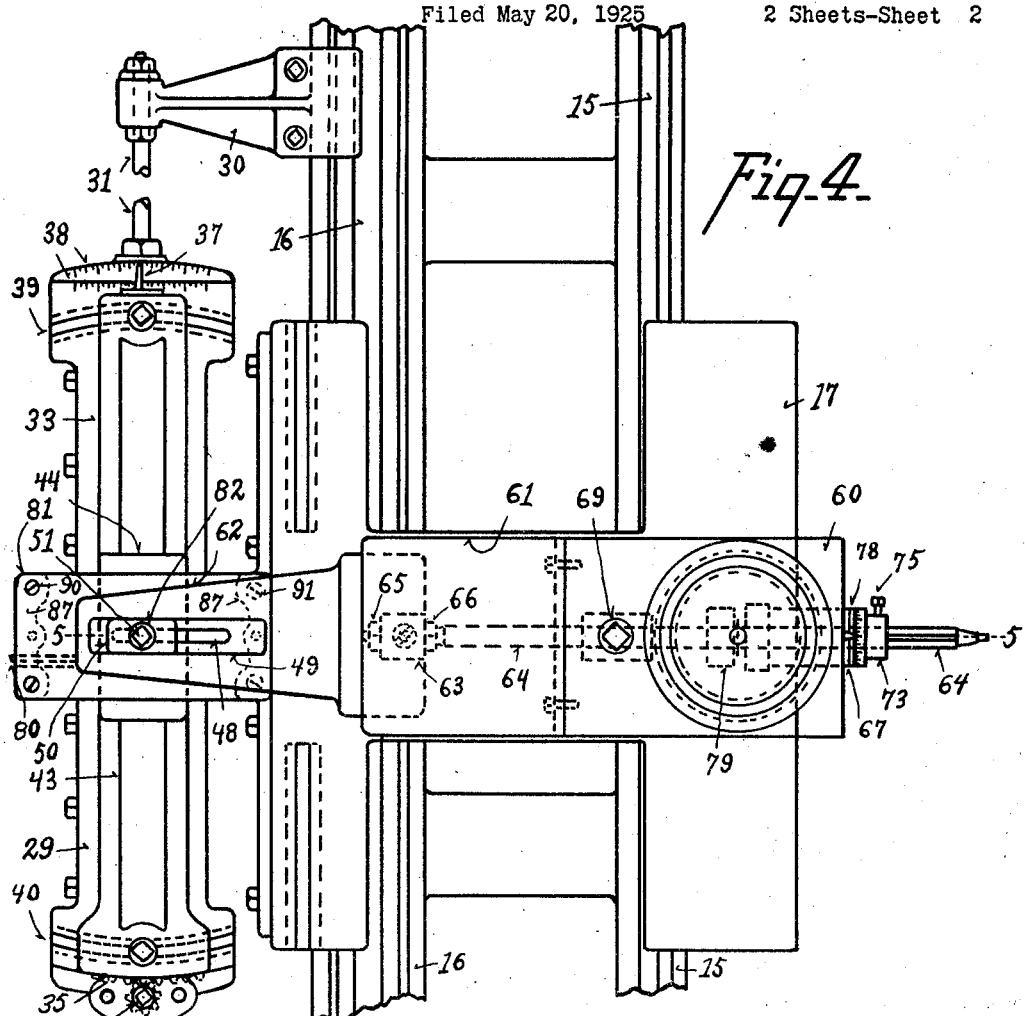
Fig. 4 is a view similar to Fig. 1 illustrating a modification thereof.
Figure 5:
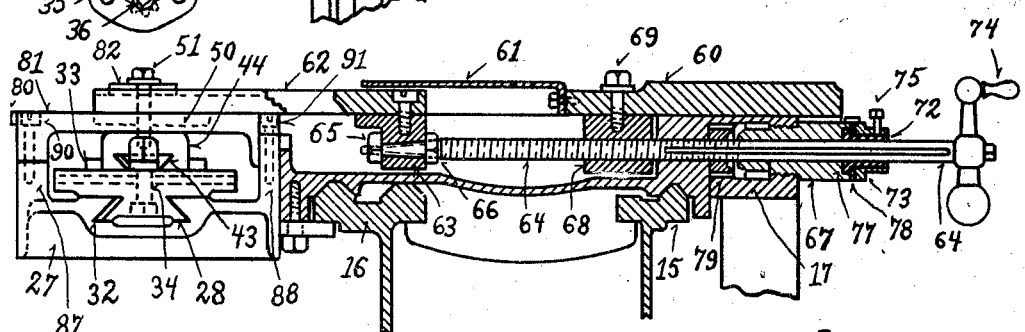
Fig. 5 is a vertical section through the apparatus of Fig. 4, taken on line 5—5 of Fig. 4.

The accompanying drawings illustrate the preferred embodiments of my invention in Figures 1 and 2 of which 15 and 16 represent the ways of a lathe. A tool carriage 17 is mounted upon the ways 15 and 16 to travel along said ways either by hand feed or by power feed. A tool slide 18 is mounted upon and relative to the tool carriage 17 by means of guide ways so as to travel thereon transversely of the lathe ways 15 and 16. A cross feed screw 22 operable by the hand lever 19, or, if desired, by power, serves to feed the tool slide 18 transversely of the tool carriage upon its guide ways. As shown in Figures 1 and 2 a universally adjustable tool slide 20 is mounted upon and above the tool slide 18, to enable the tool to be fed by a hand lever 21 attached to a feed screw forwardly and backwardly at any desired angle about a vertical center by means of which the slide 20 is rotatably adjustable upon and relative to the main slide 18. The tool slide 18 is provided with a nut 24 through which the cross feed screw 22 is threaded and the nut 24 is clamped to the slide 18 by means of a bolt 25. A gear 26 is splined to the cross feed screw to drive the cross feed screw 22 by power when desired.

The apron or support 27 for the taper attachment is attached rigidly to the rear edge of the tool carriage 17, and said apron is provided lengthwise thereof and parallel with the lathe ways with a dove-tailed guide way 28 along which the taper attachment carriage 29 is designed to travel endwise as the tool carriage moves along the ways 15 and 16 while the taper attachment carriage is held against movement endwise by means of a bracket 30 clamped rigidly to the lathe bed or ways at a distance from the tool carriage, and a connecting, or thrust bar 31 interposed between the bracket 30 and the carriage 29. A tapering gib 32 is preferably provided in the guide way 28 to enable lost motion and vibration to be taken up and avoided.

The carriage 29 is provided with a swivel guide bar 33 which is pivotally attached midway of its length at 34 to the carriage 29. At one end of the swivel guide is a curved rack 35 engaged by the teeth of a pinion 36 which is mounted upon a shaft journaled to the carriage 29 and provided above the pinion with a polygonal wrench seat, to which a wrench may be attached to turn the pinion a fraction of a revolution and thereby swivel the swivel guide bar with an accurate and uniform feed and micrometer adjustment relative to the carriage 29. The opposite end of the swivel bar is provided with a pointer 37 which travels over a double scale 38 and indicates by direct reading both the angle in degrees and the taper in inches. Curved T-slots 39 and 40 are provided near opposite ends of the carriage 29 in which are nuts engaged by bolts 41 and 42 to clamp the swivel guide bar 33 rigidly to the carriage 29 after the guide bar has been adjusted to the desired angular position upon the carriage. The swivel guide bar 33 is provided on its upper face with a dove-tailed guide way 43 extending practically the entire length of the bar 33. A shoe or plate 44 is mounted upon the guideway 43 to travel endwise thereon, and is provided with an adjustable tapered gib 45 by means of which lost motion and vibration may be eliminated.

A yoke or extension 47 is attached rigidly to the rear end of the tool slide 18 so as to move with the tool slide transversely of the lathe ways. A cross-bar or bridge 81 is mounted rigidly upon and relative to the support 27 by means of upturned edges 87 and 88 extending upwardly from the support 27, and bolts or screws 90 and 91 rigidly securing the bridge 81 at its four corners thereto, and is provided with ways to engage opposite edges of a shoe 50 extending downwardly from the yoke 47. A tapered gib 80, positively adjustable relative to the bridge 81 enables lost motion to be taken up and the free end of the yoke 47 to be positively supported against lateral strain, and avoid chattering of the tool. A bolt or stud-shaft 51 passes through a shoe 82 sliding along a guideway 49 in the upper face of the yoke 47, and thence through a slot 48 in the yoke 47, and a registering slot in the bridge 81 and is threaded into the shoe 44 below the bridge 81.

In operation the bracket 30 is rigidly attached to the lathe bed, which serves to hold the carriage 29 and bar 33 against movement endwise of the lathe bed, while the tool carriage when moved along the lathe ways, causes the yoke 47 and the plate 44 to travel endwise of and along the guideway 43 on the bar 33. By means of the bolt 51 the shoe 44 may be clamped to the yoke 47 or released therefrom. When the shoe 44 is clamped to the yoke 47, and the cross feed screw disconnected from the tool slide by disconnecting the bolt 25 from the nut 24, the movements of the tool slide 18 transversely of the tool carriage are controlled through the yoke 47 and shoe 44 by the inclination of the guideway 43, to produce any desired type of tapered lathe work. When the shoe 44 is disconnected from the yoke 47, the taper attachment is idle, and the tool carriage may be fed by hand or by power.

For certain classes of work it is desirable to be able to use the hand feed and taper feed at the same time, or to use them alternately. In the modification Figures 3 and 4 I have shown means to accomplish such results. In place of the yoke 47 attached rigidly to the tool slide 18, I provide the tool slide 60 corresponding to the tool slide 18 of Figures 1 and 2 with a shield or guard 61 which extends over and protects the yoke 62, corresponding to the yoke 47 of Figures 1 and 2, from dirt and cuttings and provides easy access to adjustments to nut 66 for lost motion. The yoke 62 is attached to the inner reduced end 63 of the cross feed screw 64, with nuts 65 and 66 at opposite ends of the reduced section 63, to take up end play and to permit the cross feed screw to rotate relative to the yoke 62 and to be fed endwise through its engagement with said yoke 62 and the taper attachment members. A nut 68 is threaded upon the cross feed screw and is adapted to be rigidly attached to the tool side 60 by means of a clamping bolt 69, to thereby cause the tool slide to feed transversely of the tool carriage with the yoke 62 when the slide 60 is clamped to the nut 68. There is provision for an endwise movement of the cross feed screw 64 relative to the tool carriage 17. The forward end of the screw 64 near its hand lever 74 is cylindrical and fitted to rotate and to slide endwise in a fixed member 67 mounted rigidly upon the tool carriage 17. The forward end of the screw 64 is also splined to receive a sliding key. In front of the member 67 is a sleeve 72 provided with a collar 77 seated in a recess in the face of member 67. An annular member 78 is screwed or bolted to the face of member 67 and serves to engage the outer face of collar 77 and retain collar 77 in position relative to member 67 and at the same time permit the sleeve 72 and collar 77 to revolve with the feed screw 64 to which the sleeve 72 is keyed. A sleeve 73 is mounted upon the exterior of sleeve 72 to rotate thereupon. The sleeve 73 is provided with an annular scale over which a stationary pointer from the member 67 projects. A setscrew 75 enables the sleeve 73 to be clamped to various adjusted positions upon and relative to the sleeve 72 to rotate therewith, and to indicate the extent to which the feed screw 64 may be rotated by hand, or by power. A gear 79 splined on the feed screw 64 enables said feed screw to be rotated by power when required. The taper attachment members to actuate the yoke 62 and slide 60 are the same as heretofore described to actuate the tool slide of Figures 1 and 2. In the apparatus of Figures 3 and 4 the cross feed screw 64 may be operated at any time while slide 60 is also being controlled by the taper attachment members through the yoke 62. The yoke 62 may be disconnected from the taper attachment by detaching the bolt 51. When the taper attachment is disconnected the feed screw 64 may be actuated by hand or by power to drive the slide 60 relative to the tool carriage 17.

My improved apparatus is free from lost motion, vibration, and chatter, which would be liable to cause ridges or other irregularities in the tapered surface of the work.

The apparatus herein shown and described is capable of considerable modification within the scope of the claims, without departing from the spirit of my invention.

What I claim is:

1. A taper attachment for a lathe comprising a swivel guide supporting member having a guide channel with upwardly extending side members, a bridge extending across said channel and rigidly attached at opposite ends to said side members, a swivel guide pivotally mounted in said channel and relative to said supporting member, and provided with a guideway longitudinally thereof, a shoe to travel along said guideway, a member connecting said shoe to a lathe tool slide through a recess in said bridge to control the transverse movement of said tool slide from said shoe, a rack segment across one end of said swivel guide, a pinion journaled to the swivel guide supporting member and engaging said rack and adjustable to angularly adjust said swivel guide relative to its supporting member, and means to rigidly clamp said swivel guide to its adjusted positions relative to its supporting member.

2. A taper attachment for a lathe comprising a swivel guide supporting member having a guide channel with upwardly extending side members, a bridge extending across said channel from one of said side members to the other and rigidly attached at opposite ends to said side members, said bridge being slotted and provided with guideways upon its upper face, a swivel guide pivotally mounted in the channel of said supporting member and relative to said supporting member, means to variably adjust the angularity of said swivel guide relative to said supporting member, a guideway longitudinally of said swivel guide, a shoe to travel along the guideway of said swivel guide, a stud-shaft extending upwardly from said shoe through the slot in said bridge, a slide member pivotally connected to said stud-shaft above said bridge and in sliding engagement with the ways on said bridge, and a member above said bridge and its slide member connecting said stud-shaft with a lathe tool slide.

3. A taper attachment for a lathe comprising a swivel guide supporting member mounted rigidly upon the tool carriage and movable therewith, guideways parallel to the direction of movement of said supporting member carried by said supporting member and located in a channel formed between upwardly extending side members of said supporting member, a bridge extending across said channel from one of said side members to the other and rigidly attached at opposite ends to the side members of said supporting member, said bridge being slotted and provided with guideways upon its upper face, a swivel guide carriage mounted to slide in the ways on said swivel guide supporting member, a swivel guide pivotally mounted upon said swivel guide carriage and located in the channel of said swivel guide supporting member, means to variably adjust the angularity of said swivel guide relative to the swivel guide carriage, a guideway longitudinally of said swivel guide, a shoe interposed between said swivel guide and said bridge to travel along the guideway of said swivel guide, a stud-shaft extending upwardly from said shoe through the slot in said bridge, a member above said bridge in sliding engagement with the ways on said bridge and connected to the stud-shaft of said shoe and also connected to a lathe tool slide to move the tool slide in unison with the movements of said shoe.

4. A taper attachment for a lathe comprising a swivel guide supporting member having a guide channel with upwardly extending side members, a bridge extending across said channel from one of said side members to the other and rigidly attached at opposite ends to said side members, said bridge being slotted and provided with guideways upon its upper face, a swivel guide carriage mounted in the channel of said supporting member and adjustable in guides relative to said supporting member, a swivel guide pivotally mounted upon said swivel guide carriage, means to variably adjust the angularity of said swivel guide relative to the swivel guide carriage, a shoe to travel longitudinally of said swivel guide and located intermediate of said swivel guide and said bridge, a stud-shaft extending upwardly from said shoe through the slot in said bridge, a member above said bridge extending from a lathe tool slide into engagement with the stud-shaft of said shoe and provided with guideways to engage the guideways of said bridge, and a gib adjustable to take up lost motion between said tool slide member and said bridge and prevent chattering of the tool slide.

5. A taper attachment for a lathe comprising a swivel guide supporting member having a guide channel with upwardly extending side members, a bridge extending across said channel from one of said side members to the other and rigidly attached at opposite ends to said side members, said bridge being slotted and provided with guideways upon its upper face, a swivel guide carriage mounted in the channel of said supporting member and adjustable in guides relative to said supporting member, a swivel guide pivotally mounted upon said swivel guide carriage, means to variably adjust the angularity of said swivel guide relative to the swivel guide carriage, a shoe to travel longitudinally of said swivel guide and located intermediate of said swivel guide and said bridge, a stud-shaft extending upwardly from said shoe through the slot in said bridge, a member above said bridge extending from a lathe tool slide feed screw into engagement with the stud-shaft of said shoe and provided with guideways to engage the guideways of said bridge, and a tool slide feed screw movable endwise relative to a lathe tool carriage with the tool slide, and adapted to be intermittently employed to feed the tool slide independently of said taper attachment.

6. A taper attachment for a lathe comprising a swivel guide supporting member movable with the tool carriage of a lathe and having a guideway for a swivel guide to travel upon, a swivel guide adjustable endwise of said supporting member upon said guideway and angularly adjustable thereon, a bridge spanning said swivel guide and mounted rigidly upon said supporting member and provided with a guideway transversely of the guideway on which said swivel guide travels, a guideway carried by said swivel guide, a shoe mounted upon and movable endwise of said angularly adjustable guideway, a connecting member connecting a lathe tool slide of a lathe tool carriage with said shoe, said connecting member being mounted to slide transversely of said swivel guide upon the guideway carried by said bridge.

7. A taper attachment for a lathe comprising a lathe tool carriage, a tool slide mounted upon said tool carriage to move transversely of said tool carriage, a cross feed screw mounted upon and rotatable relative to said tool carriage to positively feed said tool slide transversely of said tool carriage, said cross feed screw being also adjustable endwise of said screw relative to said tool carriage and the forward end of said cross-feed screw extending through and in front of said tool carriage, a swivel guide provided with a guideway longitudinally thereof, a swivel guide supporting member to which said swivel guide is pivotally attached and angularly adjustable, a shoe adjustable along the guideway of said swivel guide, a connecting member journaled at one end to said cross feed screw and at its opposite end pivotally connected to said shoe to feed said tool slide transversely through movement of said shoe along said swivel guide or through rotation of said cross feed screw, an index plate carried by and adjustable upon said cross feed screw in front of said tool carriage, and a pointer carried by and at the front of said tool carriage to indicate the extent to which said tool slide is being fed through rotation of said cross feed screw.

In testimony whereof I have affixed my signature.

PETER G. QUEDENS.